(12) United States Patent
Saha et al.

(10) Patent No.: US 12,147,906 B2
(45) Date of Patent: Nov. 19, 2024

(54) LOCALIZATION-BASED TEST GENERATION FOR INDIVIDUAL FAIRNESS TESTING OF ARTIFICIAL INTELLIGENCE MODELS

(71) Applicant: International Business Machines Corporation, Armonk, NY (US)

(72) Inventors: Diptikalyan Saha, Bangalore (IN); Aniya Aggarwal, New Delhi (IN); Sandeep Hans, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 17/239,857

(22) Filed: Apr. 26, 2021

(65) Prior Publication Data
US 2022/0343179 A1    Oct. 27, 2022

(51) Int. Cl.
*G06N 5/01* (2023.01)
*G06N 20/00* (2019.01)

(52) U.S. Cl.
CPC ............... *G06N 5/01* (2023.01); *G06N 20/00* (2019.01)

(58) Field of Classification Search
CPC ............ G06N 5/01; G06N 20/00; G06N 3/08; G06N 3/04; G06N 3/063
See application file for complete search history.

(56) References Cited

U.S. PATENT DOCUMENTS

| 10,755,338 B1 | 8/2020 | Truong et al. |
| 2014/0143525 A1 | 5/2014 | Taylor, III et al. |
| 2018/0349254 A1 | 12/2018 | Hui |
| 2019/0318722 A1 | 10/2019 | Bromand |
| 2021/0089924 A1* | 3/2021 | Kruus ...................... G06N 5/01 |
| 2021/0125106 A1* | 4/2021 | Okamoto ................. G06N 5/01 |
| 2021/0133870 A1* | 5/2021 | Kamkar .................... G06N 5/01 |

OTHER PUBLICATIONS

Angell et al., Themis: Automatically Testing Software for Discrimination, ESEC/FSE 2018.
Udeshi et al., Automated Directed Fairness Testing, ASE 2018.

(Continued)

*Primary Examiner* — Kamran Afshar
*Assistant Examiner* — Brian J Hales
(74) *Attorney, Agent, or Firm* — Ryan, Mason & Lewis, LLP

(57) ABSTRACT

Methods, systems, and computer program products for localization-based test generation for individual fairness testing of AI models are provided herein. A computer-implemented method includes obtaining at least one artificial intelligence model and training data related to the at least one artificial intelligence model; identifying one or more boundary regions associated with the at least one artificial intelligence model based at least in part on results of processing at least a portion of the training data using the at least one artificial model; generating, in accordance with at least one of the one or more identified boundary regions, one or more synthetic data points for inclusion with the training data; and executing one or more fairness tests on the at least one artificial intelligence model using at least a portion of the one or more generated synthetic data points and at least a portion of the training data.

20 Claims, 6 Drawing Sheets

(56) References Cited

OTHER PUBLICATIONS

Aggarwal et al., Black Box Fairness Testing of Machine Learning Models, ESEC/FSE 2019.
Agarwal et al., Automated Test Generation to Detect Individual Discrimination in AI Models, Association for the Advancement of Artificial Intelligence, Sep. 2018.
Craven et al., Extracting Tree-Structured Representations of Trained Networks, Advances in Neural Information Processing Systems, 1996.
Mell et al., The NIST Definition of Cloud Computing, NIST Special Publication 800-145, Sep. 2011.

* cited by examiner

LOCALIZATION-BASED TEST GENERATION FOR INDIVIDUAL FAIRNESS TESTING OF ARTIFICIAL INTELLIGENCE MODELS

BACKGROUND

The present application generally relates to information technology and, more particularly, to artificial intelligence (AI) techniques. More specifically, given an AI classification model M, a set of protected attributes (e.g., gender), specification of attribute values (e.g. male, female), individual fairness testing (also referred to herein as discrimination testing) includes performing a test wherein two samples (i.e., data points used for testing) differ only in their protected attribute values. The test fails if both samples provide two different classes. As used herein, a class refers to a category (or a target or label) assigned to one or more data points.

Conventional black box testing techniques (e.g., wherein the internals of a model are not given or known) typically include performing random searches over a feature space to generate test samples. However, such random searching techniques often result in conventional techniques being error-prone and/or inaccurate because such techniques include significant limits to the number of test cases that can be executed.

SUMMARY

In one embodiment of the present invention, techniques for localization-based test generation for individual fairness testing of AI models are provided. An exemplary computer-implemented method can include obtaining at least one artificial intelligence model and training data related to the at least one artificial intelligence model, and identifying one or more boundary regions associated with the at least one artificial intelligence model based at least in part on results of processing at least a portion of the training data using the at least one artificial model. The method also includes generating, in accordance with at least one of the one or more identified boundary regions, one or more synthetic data points for inclusion with the training data, and executing one or more fairness tests on the at least one artificial intelligence model using at least a portion of the one or more generated synthetic data points and at least a portion of the training data.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, at least one embodiment includes automatically performing localization-based effective and realistic test generation for individual fairness testing for AI models (also referred to herein as black box models). Such an embodiment includes implementing an effective search method for fairness testing using one or more boundary regions of an AI model, for example, by automatically identifying at least one boundary region and generating realistic synthetic data given one or more localization constraints related to the identified boundary region(s). As used herein, with respect to fairness testing, given a data point p and a data point p' such that p and p' differ only in connection with at least one protected attribute, if a model predicts different classes for p and p', one or more embodiments include determining that such a test fails. A fairness test can include, for example, creating a data point p' by changing the protected attributed value for a data point p, and determining whether the prediction on p and p' are the same or not.

As detailed herein, one or more embodiments include identifying boundary regions of an AI model by using one or more samples related to established accuracy failure(s) and/or low confidence levels of the AI model. Such samples can include, for example, data points related to an incorrect class prediction by the model and/or a correct class prediction by the model with a low probability level. Such an embodiment further includes generating realistic synthetic data for individual fairness testing of the AI using perturbation in the identified boundary regions. As used herein, "perturbation" refers to changing the value(s) of one or more attributes of a given sample. In the above-noted case, and in at least one embodiment, one or more attributes of boundary samples are altered.

Additionally or alternatively, at least one embodiment can include identifying boundary regions of the AI model by using a decision tree surrogate of the AI model. In such an embodiment, a decision tree can be generated using one or more algorithms (e.g., the TREPAN algorithm) that create a surrogate decision tree for a given model. For each path in the tree, one or more narrow regions are created in the boundary of the path region by perturbing one or more attributes. Such an embodiment can also include generating realistic synthetic data for individual fairness testing of the AI model by using the identified boundary regions of the decision tree surrogate of the AI model. By way of example, once the one or more narrow regions are identified using the decision tree surrogate, synthetic data can be generated using perturbation in the identified narrow region(s).

Figure 1:
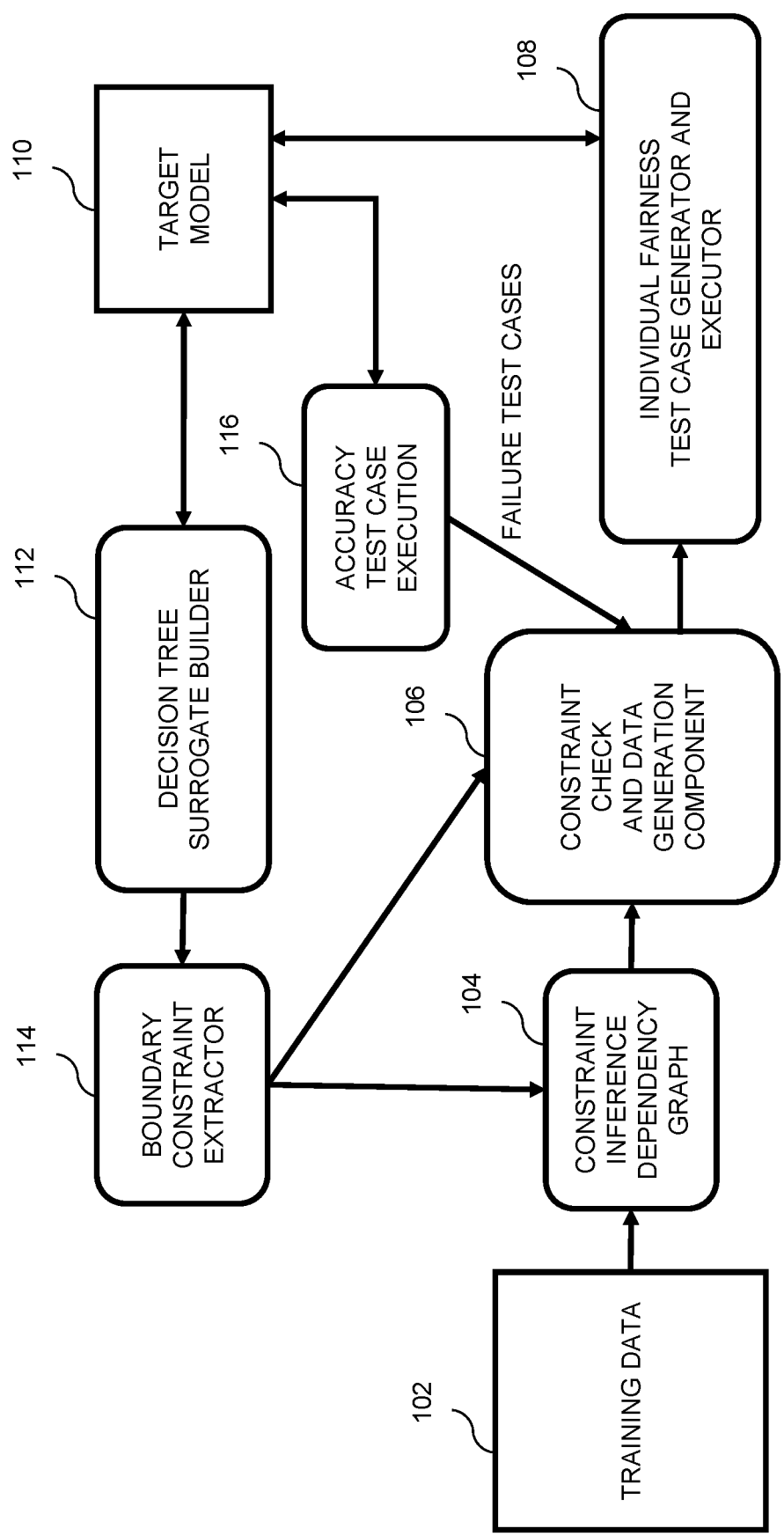
FIG. 1 is a diagram illustrating system architecture, according to an exemplary embodiment of the invention.

FIG. 1 is a diagram illustrating system architecture, according to an embodiment of the invention. By way of illustration, FIG. 1 depicts training data 102, which is used to generate and/or update a constraint inference dependency graph 104 (such as illustrated, for example, in FIG. 2). FIG. 1 also depicts a target model 110 (e.g., a target black box model and/or AI model), which is used in an accuracy test case execution 116 as well as used as input to a decision tree surrogate builder 112. The decision tree surrogate generated by builder 112 is output and used by boundary constraint extractor 114, which identifies one or more boundaries of the decision tree surrogate and outputs information related to the identified boundaries to be processed and/or implemented via constraint inference dependency graph 104 and constraint check and data generation component 106 (which also processes inputs from the constraint inference dependency graph 104).

As also depicted in FIG. 1, failure test cases generated from the accuracy test case execution 116 are provided as input to constraint check and data generation component 106. Based at least in part on the inputs from constraint inference dependency graph 104, boundary constraint extractor 114, and/or accuracy test case execution 116, constraint check and data generation component 106 generates synthetic data and provides at least such inputs to individual fairness test case generator and executor 108, which also interacts and/or exchanges data with target model 110.

As illustrated in FIG. 1 and further detailed herein, one or more embodiments include generating synthetic data in an identified boundary region of a model. Such an embodiment includes identifying existing accuracy failure test samples and/or low confidence success test samples and prioritizing such samples according to one or more parameters. Such prioritization parameters can include, for example, prioritizing accuracy failure samples over low confidence success samples. In connection with prioritizing within accuracy failure samples, such samples are ranked using confidence levels associated therewith (e.g., a higher confidence of prediction corresponds to a higher priority). In connection with prioritizing within low confidence success samples, such samples can be prioritized, for example, using prediction confidence levels corresponding thereto (e.g., a lower confidence in a prediction corresponds to a higher priority).

Also, at least one embodiment includes generating additional samples by perturbing such prioritized test samples within a predefined distance. By way of example, for every test sample, such an embodiment can include using a local explainer (e.g., one or more local interpretable model-agnostic explanations) to determine the relative importance of one or more attributes in the local explanation. Further, such an embodiment includes generating an order of importance among the one or more attributes.

In accordance with such an embodiment, one or more perturbation schemes can be implemented in connection with identified boundary regions of a given model. For example, consider a range of numeric values such as, e.g., salaries, in connection with categories such as, e.g., educational levels (e.g., primary, bachelor's degree, master's degree, PhD) across male and female individuals. If, by way merely of illustration, for female individuals within the test samples, the only education values are {primary, bachelor's degree}, then one or more embodiments would include ensuring that, for all female samples used in additional tests, these two educational values are the only allowed values.

As detailed above, perturbation refers to changing attribute values to generate additional samples. Consider, by way merely of illustration, a sample with gender=Female, wherein the education level attribute is to be perturbed. In such an example, if the attribute "education level" is to be perturbed, the possible options for new values might include primary, master's, PhD, etc. Additionally, if the value of the gender attribute in this sample has a value of "Female," with only possible education value for female as bachelor's and PhD, then when changing (i.e., perturbing) the education level for this sample, the only new values can be bachelor's and PhD.

Additionally, at least one embodiment includes implementing a generation scheme. For example, such an embodiment can include obtaining and/or determining a process order of attributes to generate values. Obtaining and/or determining a process order can include using attribute confidence levels in a local explanation from a local interpretable model-agnostic explanation, and for any remaining attributes, using an ordering from a dependency graph (e.g., as illustrated in the FIG. 2 example) and append one or more portions (e.g., end portions) of such a graph. In such an embodiment, an ordering from a dependency graph can be appended to the process order of attributes obtained from a local explainer. The generation scheme, for example, can use this attribute order.

Further, for every attribute in a process order, one or more embodiments include generating perturbation as follows. For a numeric attribute, such an embodiment includes setting a range of perturbation as the intersection of all ranges in one or more related associations. By way merely of example, consider attributes of education level (e.g., primary, bachelor's degree, master's degree, PhD), gender (e.g., male, female), and age (e.g., 20, 60). If, for instance, Gender=female, Age $\in[27,50]$; and Education=PhD, Age $\in[32, 60]$, then, an example embodiment would include ensuring that for all samples included females with a PhD degree, age $\in[32, 50]$.

For a category attribute, at least one embodiment includes setting possible values for perturbation considering applicable associations on already-generated values. For example, consider attributes including education level (e.g., primary, bachelor's degree, master's degree, PhD) and gender (e.g., male, female). If, by way merely of illustration, for Gender=female, the only education values in the sample(s) are (primary, bachelor's degree), then an example embodiment would include ensuring that, for all female samples, the two noted values are the only allowed values for the educational level attribute.

As also detailed herein, one or more embodiments include performing data synthesis in connection with an identified boundary region. Such an embodiment includes generating a decision tree model from a given AI model (e.g., using an extraction algorithm such as, e.g., the TREPAN algorithm), and prioritizing paths in the tree in decreasing order of the path's coverage (e.g., by inputs used by a TREPAN algorithm (i.e., training and additional samples)). By way of example, a path with higher coverage can be given higher priority.

For each path in the decision tree, at least one embodiment includes creating one or more narrow regions in the boundary of regions defined as constraints (e.g., Gender=male, $24 \leq Age \leq 30$, and Salary$\leq$\$50,000.00). For each boundary region, such an embodiment can include selecting training data in that region. If sufficient data samples are present in that region, such an embodiment includes generating one or more constraints from the selected training data, and generating a given amount (e.g., the total number of required samples per the number of boundary regions) of data. If sufficient data samples are not present in that region, such an embodiment includes generating one or more constraints from the entire set of training data.

By way merely of illustration, consider an example use case wherein a salary attribute for data samples of male individuals encompasses a range of [$30,000; $100,000] while the salary at tribute for the overall dataset encompasses a range of [$10,000; $100,000]. For a boundary region that includes Gender=male, 24≤Age≤30, Salary≤$50,000, if an example embodiment includes using the salary attribute as a leaf in a dependency graph (e.g., a directed acyclic graph (DAG)), values of the salary attribute in generated samples may lie in a [$10,000; $50,000] range, but should lie in a [$30,000; $50,000] range. The lower bound of $30,000 in this example is derived from association constraints, which may or may not be present in region constraints.

Accordingly, while making the salary attribute a leaf in the dependency graph (e.g., DAG), such an embodiment can include setting the range of salary values using associations and one or more feature constraints. For example, the range of salary values can correspond to an intersection of (i) all ranges in related associations and (ii) the total range of salary values. If such an intersection range comes out to be null, then one or more embodiments include relaxing and/or ignoring one or more of the associations.

Figure 2:
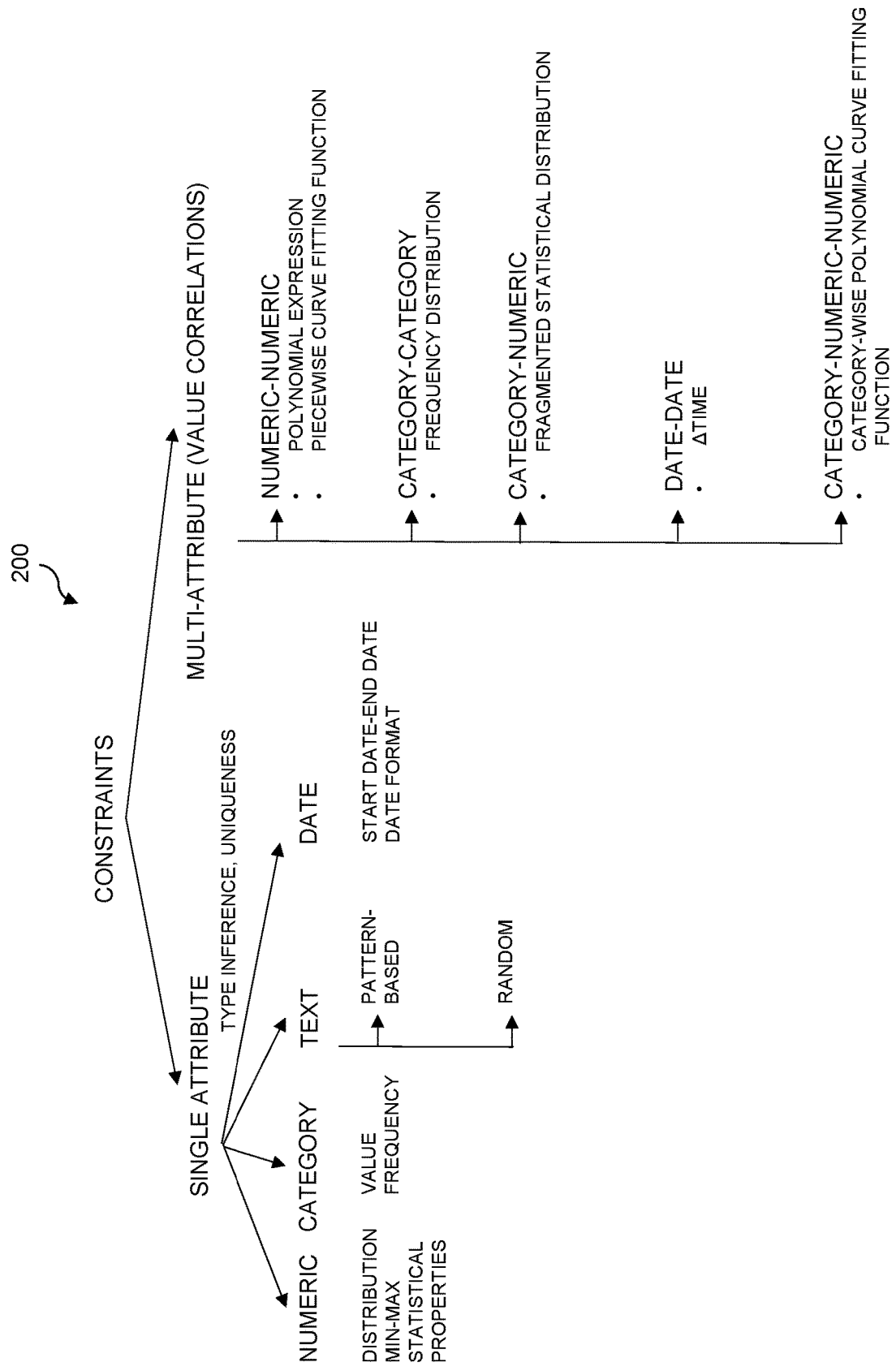
FIG. 2 is a diagram illustrating a constraint inference dependency graph, according to an exemplary embodiment of the invention.

FIG. 2 is a diagram illustrating a constraint inference dependency graph 200, according to an exemplary embodiment of the invention. By way of illustration, dependency graph 200 depicts branches directed to single attribute constraints and multi-attribute constraints (which can include value correlations). The single attribute constraint branch can be further partitioned into sub-branches or leaves such as, for example, numeric attributes, category and/or categorical attributes, text attributes, and date attributes. Numeric attributes (such as, for example, age, salary, etc.) can be associated with distribution minimum-maximum statistical properties and/or ranges. Category and/or categorical attributes (e.g., gender, quarter number, etc.) can be associated with value frequencies. Text attributes can be pattern-based (e.g., identification numbers, etc.) and/or random (e.g., comments, names, etc.). Also, date attributes (e.g., order timestamps, etc.) can include, for example, a start date-end date format.

The multi-attribute constraint branch can be further partitioned into sub-branches or leaves such as, for example, numeric-numeric attributes, category-category attributes, category-numeric attributes, date-date attributes, category-numeric-numeric attributes, etc. Numeric-numeric attributes can be implemented and/or associated using a polynomial expression and/or a piecewise curve fitting function. By way merely of example, such a polynomial expression can include a linear function or a quadratic function between numeric attributes. Category-category attributes can be implemented and/or associated using at least one frequency distribution. Category-numeric attributes can be implemented and/or associated using at least one fragmented statistical distribution (e.g., for a male attribute, using a normal distribution for an age attribute, and for a female attribute, using a beta distribution for an age attribute). Date-date attributes can be implemented and/or associated using time delta values (e.g., delivery_dt=order_dt+$\Delta$, wherein x≤$\Delta$t≤y). Also, category-numeric-numeric attributes can be implemented and/or associated using at least one category-wise polynomial curve fitting function.

In connection with a constraint inference dependency graph such as depicted in FIG. 2, one or more embodiments include implementing an algorithm for data synthesis based on one or more constraints. In at least one embodiment, such an algorithm includes creating a constraint dependency graph, wherein each node represents an attribute with associated attribute constraints (with confidence value(s)), and each edge represents association constraints between attributes (with confidence value(s)). Also, such an algorithm includes removing one or more cycles from the graph by removing one or more minimal confidence edges in the cycles. Further, such an algorithm includes processing the graph in topological order and generating data for each attribute by considering association constraints.

Figure 3:
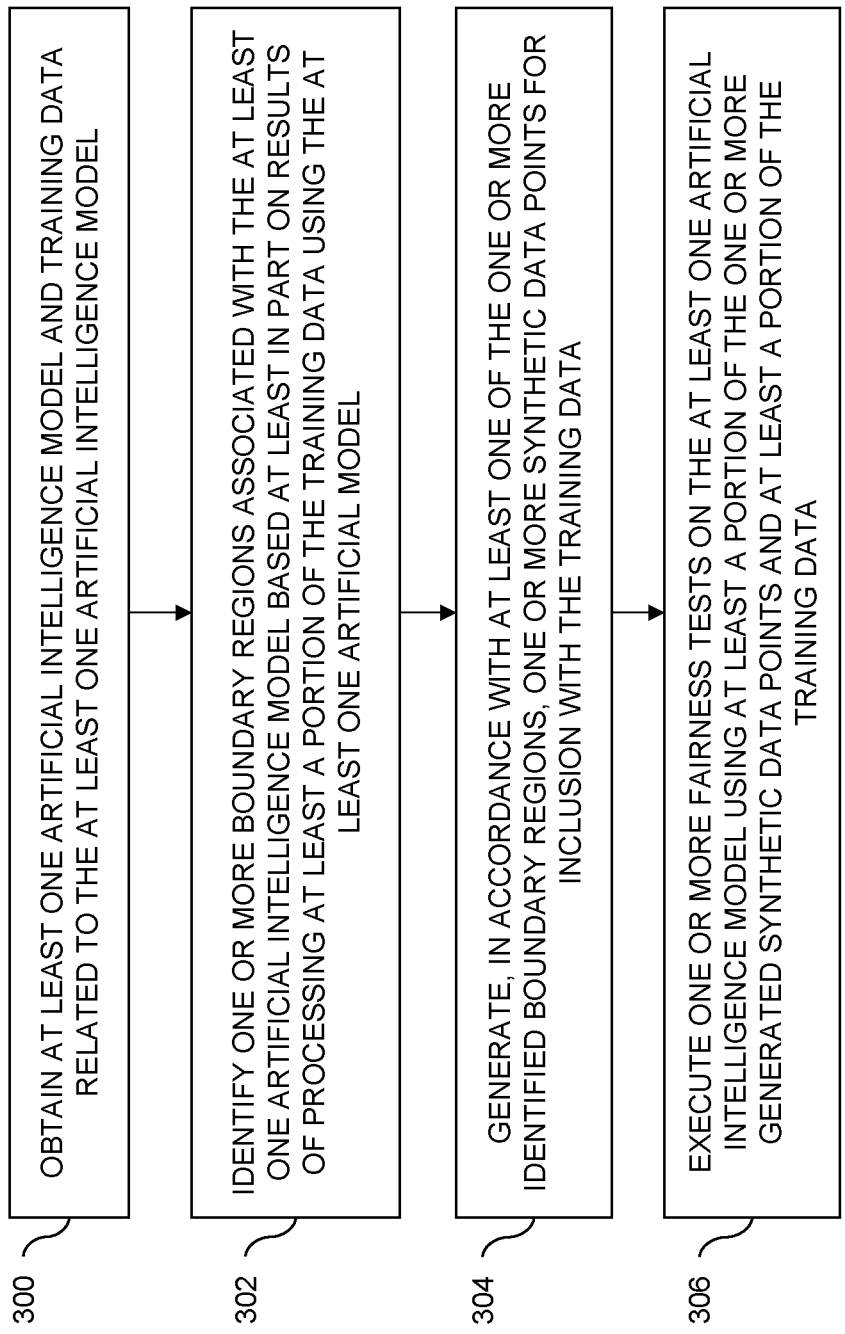
FIG. 3 is a flow diagram illustrating techniques according to an embodiment of the invention.

FIG. 3 is a flow diagram illustrating techniques according to an embodiment of the present invention. Step 300 includes obtaining at least one artificial intelligence model and training data related to the at least one artificial intelligence model. In at least one embodiment, obtaining training data related to the at least one artificial intelligence model includes identifying one or more data attributes associated with at least a portion of the training data.

Step 302 includes identifying one or more boundary regions associated with the at least one artificial intelligence model based at least in part on results of processing at least a portion of the training data using the at least one artificial model. In one or more embodiments, identifying one or more boundary regions includes determining at least one neighborhood of low confidence accuracy testing failure examples associated with the at least one artificial intelligence model. Additionally or alternatively, identifying one or more boundary regions includes generating at least one decision tree surrogate of the at least one artificial intelligence model and identifying one or more regions pertaining to a boundary of the decision tree surrogate.

Step 304 includes generating, in accordance with at least one of the one or more identified boundary regions, one or more synthetic data points for inclusion with the training data. In at least one embodiment, generating one or more synthetic data points includes generating one or more synthetic data points using at least a portion of the one or more identified regions pertaining to a boundary of the decision tree surrogate. Additionally or alternatively, generating one or more synthetic data points includes determining one or more constraints from the training data, and determining a required amount of data to be generated based at least in part on the one or more constraints. Further, in one or more embodiments, generating one or more synthetic data points includes generating one or more synthetic data points for each of one or more fairness tests using one or more perturbation techniques in connection with at least a portion of the one or more identified boundary regions.

Step 306 includes executing one or more fairness tests on the at least one artificial intelligence model using at least a portion of the one or more generated synthetic data points and at least a portion of the training data. Also, at least one embodiment can include generating the one or more fairness tests with respect to one or more data attributes.

Additionally, one or more embodiments include providing software implementing the techniques depicted in FIG. 3 as a service in a cloud environment.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
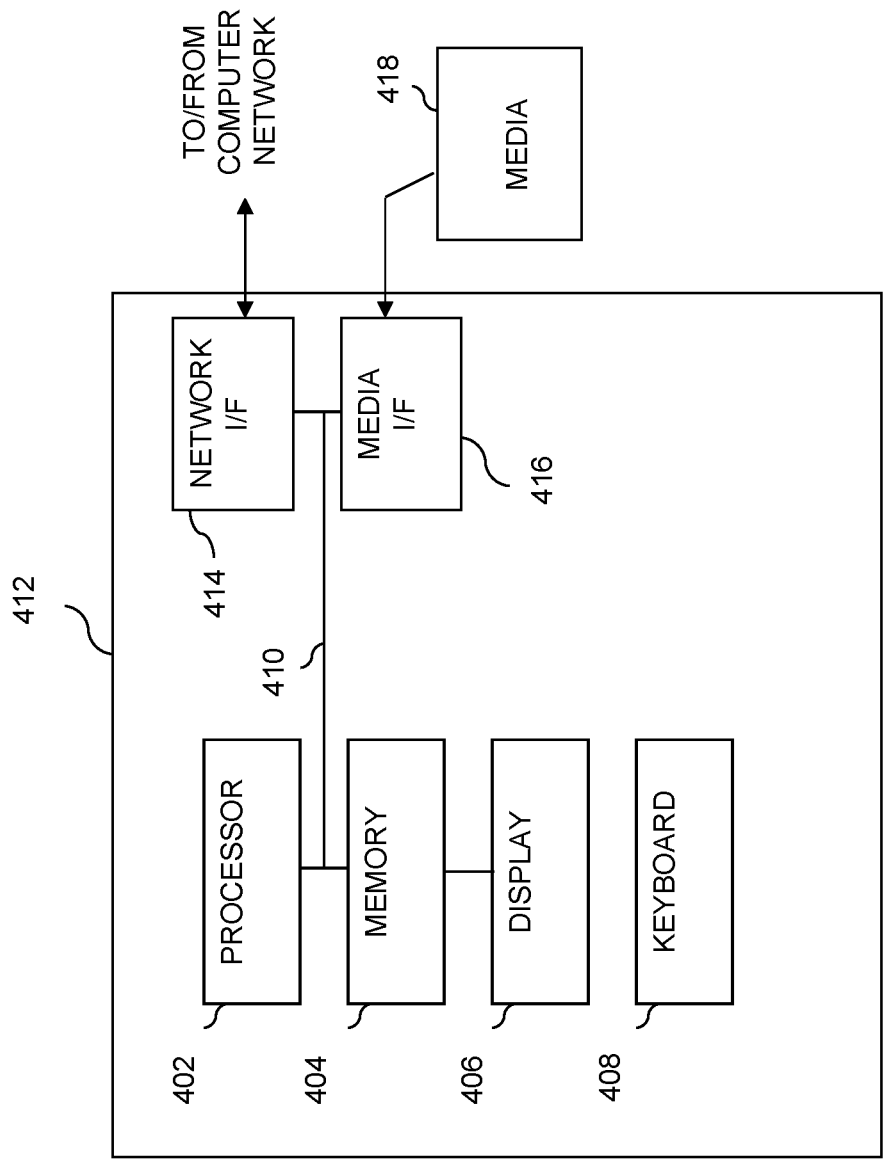
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
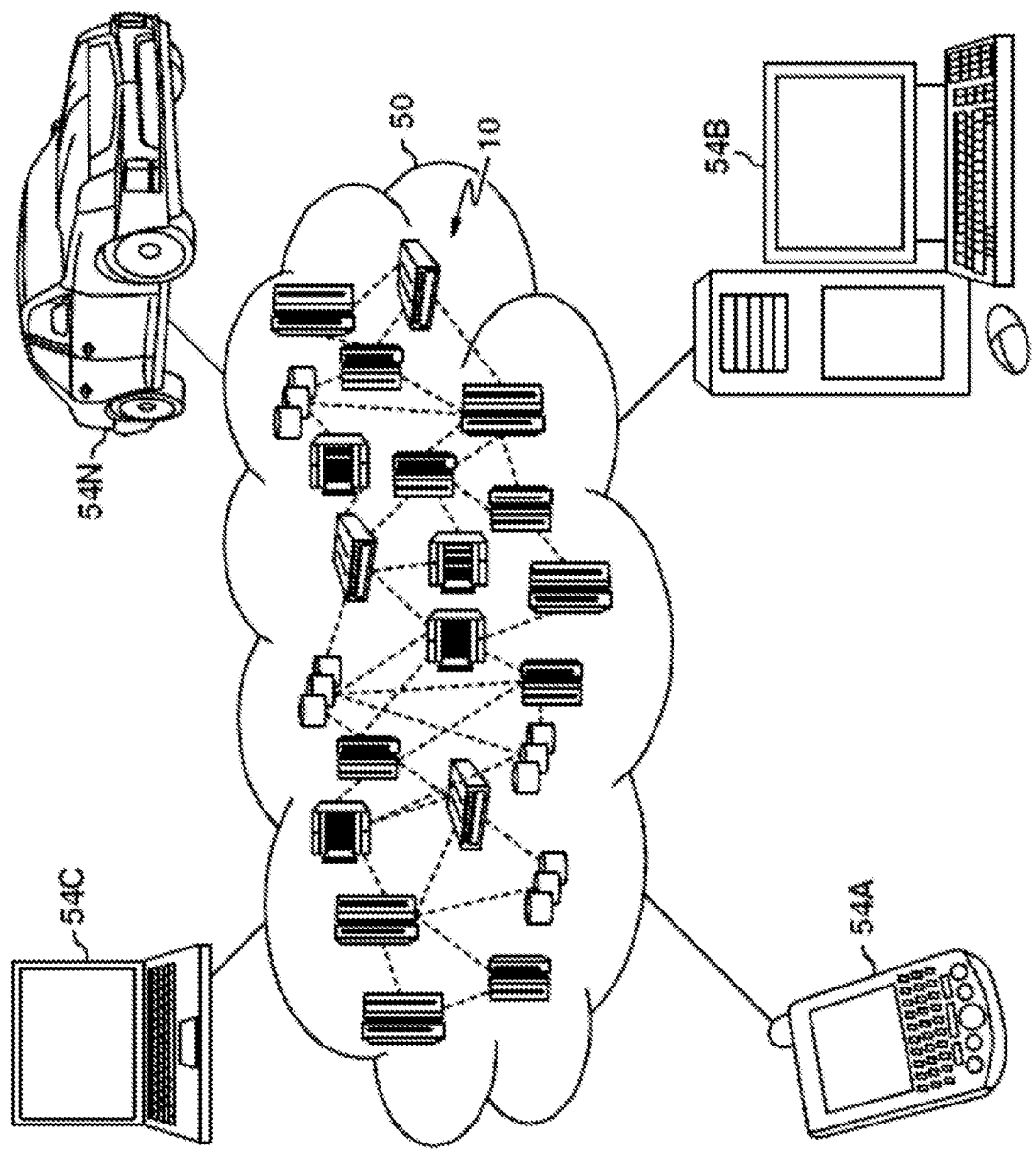
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
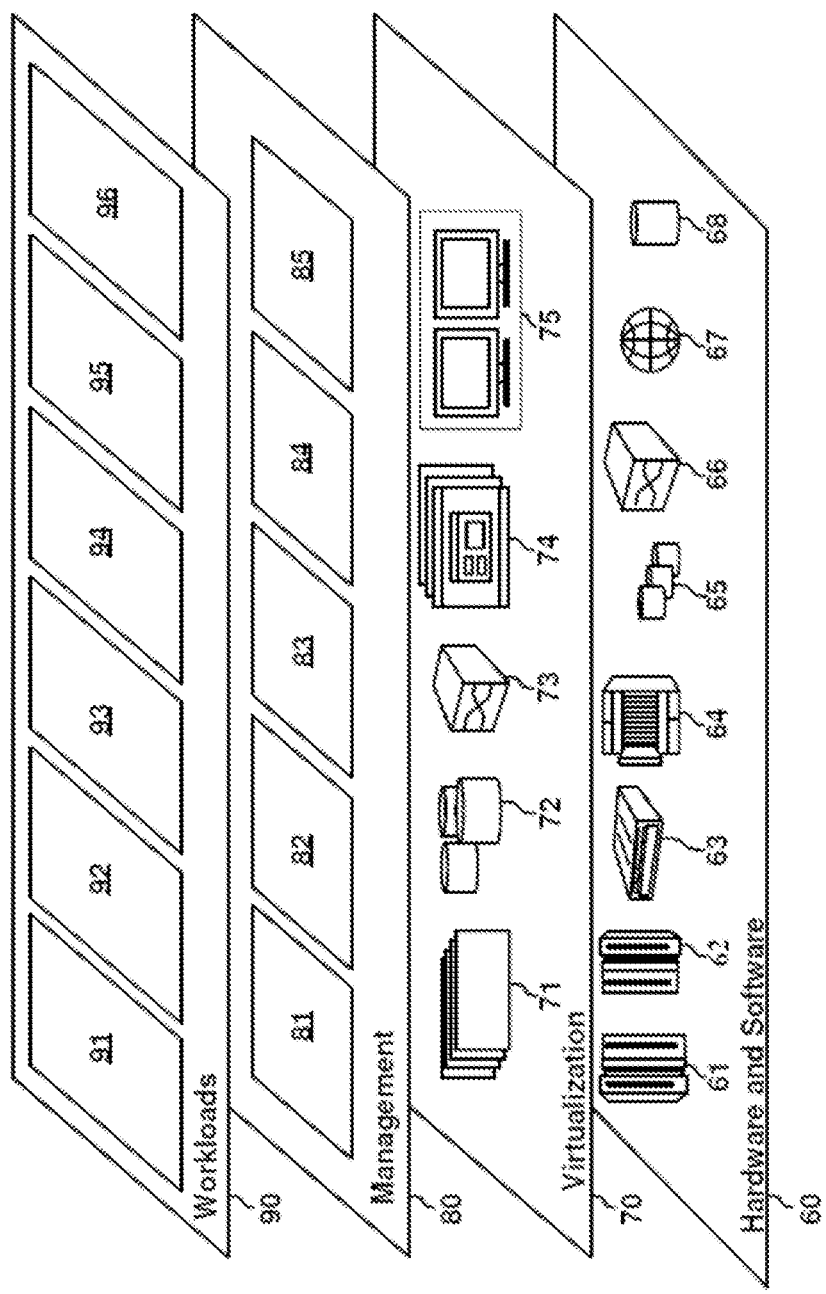
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and localization-based test generation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically performing localization-based test generation for individual fairness testing of AI models.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining at least one artificial intelligence model and training data related to the at least one artificial intelligence model;
   identifying one or more boundary regions associated with the at least one artificial intelligence model based at least in part on results of processing at least a portion of the training data using the at least one artificial intelligence model, wherein identifying one or more boundary regions comprises generating, using at least one extraction algorithm, at least one artificial intelligence-based decision tree surrogate model of the at least one artificial intelligence model and identifying one or more regions pertaining to at least one boundary of the at least one artificial intelligence-based decision tree surrogate model;
   generating, in accordance with at least one of the one or more identified boundary regions, one or more synthetic data points for inclusion with the training data;
   executing one or more fairness tests on the at least one artificial intelligence model using at least a portion of the one or more generated synthetic data points and at least a portion of the training data; and
   modifying, based at least in part on results of executing the one or more fairness tests, one or more parameters of the at least one artificial intelligence model;
   wherein the method is carried out by at least one computing device.

2. The computer-implemented method of claim 1, wherein obtaining training data related to the at least one artificial intelligence model comprises identifying one or more data attributes associated with at least a portion of the training data.

3. The computer-implemented method of claim 1, wherein identifying one or more boundary regions comprises determining at least one neighborhood of low confidence accuracy testing failure examples associated with the at least one artificial intelligence model.

4. The computer-implemented method of claim 1, wherein generating one or more synthetic data points comprises generating one or more synthetic data points using at least a portion of the one or more identified regions pertaining to the at least one boundary of the at least one artificial intelligence-based decision tree surrogate model.

5. The computer-implemented method of claim 1, wherein generating one or more synthetic data points comprises determining one or more constraints from the training data.

6. The computer-implemented method of claim 5, further comprising:
   determining a required amount of data to be generated based at least in part on the one or more constraints.

7. The computer-implemented method of claim 1, wherein generating one or more synthetic data points comprises generating one or more synthetic data points for each of one or more fairness tests using one or more perturbation techniques in connection with at least a portion of the one or more identified boundary regions.

8. The computer-implemented method of claim 1, further comprising:
   generating the one or more fairness tests with respect to one or more data attributes.

9. The computer-implemented method of claim 1, wherein software implementing the method is provided as a service in a cloud environment.

10. A computer program product comprising a computer readable storage medium having program instructions embodied therewith, the program instructions executable by a computing device to cause the computing device to:
    obtain at least one artificial intelligence model and training data related to the at least one artificial intelligence model;
    identify one or more boundary regions associated with the at least one artificial intelligence model based at least in part on results of processing at least a portion of the training data using the at least one artificial intelligence model, wherein identifying one or more boundary regions comprises generating, using at least one extraction algorithm, at least one artificial intelligence-based decision tree surrogate model of the at least one artificial intelligence model and identifying one or more regions pertaining to at least one boundary of the at least one artificial intelligence-based decision tree surrogate model;
    generate, in accordance with at least one of the one or more identified boundary regions, one or more synthetic data points for inclusion with the training data; and
    execute one or more fairness tests on the at least one artificial intelligence model using at least a portion of the one or more generated synthetic data points and at least a portion of the training data; and modify, based at least in part on results of executing the one or more fairness tests, one or more parameters of the at least one artificial intelligence model.

11. The computer program product of claim 10, wherein obtaining training data related to the at least one artificial intelligence model comprises identifying one or more data attributes associated with at least a portion of the training data.

12. The computer program product of claim 10, wherein identifying one or more boundary regions comprises determining at least one neighborhood of low confidence accuracy testing failure examples associated with the at least one artificial intelligence model.

13. The computer program product of claim 10, wherein generating one or more synthetic data points comprises generating one or more synthetic data points using at least a portion of the one or more identified regions pertaining to the at least one boundary of the at least one artificial intelligence-based decision tree surrogate model.

14. The computer program product of claim 10, wherein generating one or more synthetic data points comprises determining one or more constraints from the training data.

15. The computer program product of claim 14, wherein the program instructions executable by the computing device further cause the computing device to:

determine a required amount of data to be generated based at least in part on the one or more constraints.

16. The computer program product of claim 10, wherein generating one or more synthetic data points comprises generating one or more synthetic data points for each of one or more fairness tests using one or more perturbation techniques in connection with at least a portion of the one or more identified boundary regions.

17. The computer program product of claim 10, wherein the program instructions executable by the computing device further cause the computing device to:

generate the one or more fairness tests with respect to one or more data attributes.

18. A system comprising:
a memory configured to store program instructions; and
a processor operatively coupled to the memory to execute the program instructions to:

obtain at least one artificial intelligence model and training data related to the at least one artificial intelligence model;

identify one or more boundary regions associated with the at least one artificial intelligence model based at least in part on results of processing at least a portion of the training data using the at least one artificial intelligence model, wherein identifying one or more boundary regions comprises generating, using at least one extraction algorithm, at least one artificial intelligence-based decision tree surrogate model of the at least one artificial intelligence model and identifying one or more regions pertaining to at least one boundary of the at least one artificial intelligence-based decision tree surrogate model;

generate, in accordance with at least one of the one or more identified boundary regions, one or more synthetic data points for inclusion with the training data;

execute one or more fairness tests on the at least one artificial intelligence model using at least a portion of the one or more generated synthetic data points and at least a portion of the training data; and modify, based at least in part on results of executing the one or more fairness tests, one or more parameters of the at least one artificial intelligence model.

19. The system of claim 18, wherein identifying one or more boundary regions comprises determining at least one neighborhood of low confidence accuracy testing failure examples associated with the at least one artificial intelligence model.

20. The system of claim 18, wherein generating one or more synthetic data points comprises generating one or more synthetic data points for each of one or more fairness tests using one or more perturbation techniques in connection with at least a portion of the one or more identified boundary regions.

* * * * *